US012330068B2

(12) United States Patent
Luo

(10) Patent No.: US 12,330,068 B2
(45) Date of Patent: Jun. 17, 2025

(54) GAME LOGIN METHOD AND DEVICE

(71) Applicant: SHANGHAI HODE INFORMATION TECHNOLOGY CO., LTD., Shanghai (CN)

(72) Inventor: Zhiyun Luo, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 298 days.

(21) Appl. No.: 18/037,753

(22) PCT Filed: Sep. 24, 2021

(86) PCT No.: PCT/CN2021/120379
§ 371 (c)(1),
(2) Date: May 18, 2023

(87) PCT Pub. No.: WO2022/105424
PCT Pub. Date: May 27, 2022

(65) Prior Publication Data
US 2024/0001247 A1   Jan. 4, 2024

(30) Foreign Application Priority Data
Nov. 19, 2020   (CN) .......................... 202011302636.3

(51) Int. Cl.
*A63F 13/79*   (2014.01)
*G06F 21/62*   (2013.01)
*H04L 9/40*   (2022.01)

(52) U.S. Cl.
CPC ............ *A63F 13/79* (2014.09); *G06F 21/629* (2013.01); *H04L 63/102* (2013.01)

(58) Field of Classification Search
None
See application file for complete search history.

(56) References Cited

U.S. PATENT DOCUMENTS 8,560,747 B1   10/2013   Tan et al.
11,218,473 B2 *   1/2022   Cheek ................. H04L 63/1466
(Continued)

FOREIGN PATENT DOCUMENTS

CN   101184204 A   5/2008
CN   101997868 A   3/2011
(Continued)

OTHER PUBLICATIONS

International Patent Application No. PCT/CN2021/120379; Int'l Search Report; dated Dec. 17, 2021; 2 pages.

*Primary Examiner* — Jason T Yen
(74) *Attorney, Agent, or Firm* — BakerHostetler

(57) ABSTRACT

This application provides a game login method. The game login method includes receiving a login request sent by a client computing device, where the login request carries a login account; determining at least two groups of corresponding network addresses based on the login account; determining whether the client computing device belongs to a lock region based on lock region configuration corresponding to the login request and the at least two groups of network addresses; and in response to determining that the client computing device does not belong to the lock region, performing login based on the login request.

20 Claims, 6 Drawing Sheets

(56) References Cited

U.S. PATENT DOCUMENTS

| | | | |
|---|---|---|---|
| 2006/0265735 A1 | 11/2006 | Ohno | |
| 2014/0045596 A1* | 2/2014 | Vaughan | G07F 17/3225 463/42 |
| 2017/0295159 A1* | 10/2017 | Arora | G06F 21/6218 |
| 2021/0126940 A1* | 4/2021 | O'Hara | H04L 63/126 |
| 2025/0141930 A1* | 5/2025 | Ma | H04L 63/0435 |

FOREIGN PATENT DOCUMENTS

| | | |
|---|---|---|
| CN | 103259879 A | 8/2013 |
| CN | 104601547 A | 5/2015 |
| CN | 104917756 A | 9/2015 |
| CN | 106412498 A | 2/2017 |
| CN | 106936806 A | 7/2017 |
| CN | 107019916 A | 8/2017 |
| CN | 107885978 A | 4/2018 |
| CN | 108377231 A | 8/2018 |
| CN | 110324345 A | 10/2019 |
| CN | 112422570 A | 2/2021 |
| WO | WO 2001/014989 A1 | 3/2001 |

\* cited by examiner

GAME LOGIN METHOD AND DEVICE

CROSS-REFERENCE TO RELATED APPLICATIONS

This application is the U.S. National Stage of International Application No. PCT/CN2021/120379, filed on Sep. 24, 2021, which claims priority to Chinese Patent Application No. 202011302636.3, filed with the China National Intellectual Property Administration on Nov. 19, 2020, and entitled "GAME LOGIN METHOD AND APPARATUS", both of which are incorporated herein by reference in their entireties.

TECHNICAL FIELD

Embodiments of this application relate to the field of computer technologies, and in particular, to a game login method. One or more embodiments of this application simultaneously relate to a game login apparatus, a computing device, a computer-readable storage medium, and a computer program product.

BACKGROUND

With rapid development of computer technologies, a growing number of games have emerged, which have become indispensable entertainment in life for most people. When a game is released in different regions, to allow the game to be logged in only in some regions, but not in another region, the game is usually configured with a lock region in which the game cannot be logged in. Only a client that does not belong to the lock region can normally log in to the game.

In the conventional technology, a lock region of a game is often configured in a physical lock or geographical lock manner. Subsequently, when a client requests to log in to the game, a physical lock manner is mainly to perform authentication by using hardware or software code of the client, to determine whether the login is allowed; and the geographical lock manner is mainly to determine a location of the client through Global Positioning System (GPS) positioning, to determine whether the login is allowed.

However, the physical lock manner relies on preparation of hardware and software resources before a game is released, and is less applicable to a mobile game with a short release cycle and a compact pace. However, in the geographical lock manner, a user needs to authorize GPS positioning. With increasingly strict personal data protection, for a user who does not want to authorize positioning information, a location of a client cannot be determined. Therefore, when the client requests to log in to a game, verification cannot be performed, resulting in a relatively low success rate of lock region verification when the client requests to log in to the game.

SUMMARY

In view of this, embodiments of this application provide a game login method. One or more embodiments of this application simultaneously relate to a game login apparatus, a computing device, a computer-readable storage medium, and a computer program product, to resolve a technical defect in the conventional technology that sensitive information of a user is relied on compulsorily, which results in a low success rate of lock region verification when a client requests to log in to a game.

According to a first aspect of the embodiments of this application, a game login method is provided and includes:
  receiving a login request sent by a client, where the login request carries a login account;
  obtaining at least two groups of corresponding network addresses based on the login account;
  determining, based on lock region configuration corresponding to the login request and the at least two groups of network addresses, whether the client belongs to a lock region; and
  when the client does not belong to the lock region, performing login based on the login request.

According to a second aspect of the embodiments of this application, a game login apparatus is provided and includes:
  a receiving module, configured to receive a login request sent by a client, where the login request carries a login account;
  a first obtaining module, configured to obtain at least two groups of corresponding network addresses based on the login account;
  a first determining module, configured to determine, based on lock region configuration corresponding to the login request and the at least two groups of network addresses, whether the client belongs to a lock region; and
  a login module, configured to: when the client does not belong to the lock region, perform login based on the login request.

According to a third aspect of the embodiments of this application, a computing device is provided and includes:
  a memory and a processor, where
  the memory is configured to store computer executable instructions, and the processor is configured to execute the computer executable instructions to implement the following method:
  receiving a login request sent by a client, where the login request carries a login account;
  obtaining at least two groups of corresponding network addresses based on the login account;
  determining, based on lock region configuration corresponding to the login request and the at least two groups of network addresses, whether the client belongs to a lock region; and
  when the client does not belong to the lock region, performing login based on the login request.

According to a fourth aspect of the embodiments of this application, a computer-readable storage medium is provided. The computer-readable storage medium stores computer executable instructions, and the computer executable instructions are executed by a processor to implement the steps of the game login method.

According to a fifth aspect of the embodiments of this application, a computer program product is provided. When the computer program product is executed in a computer, the computer is enabled to perform any of the steps of the foregoing game login method.

According to the game login method provided in the embodiments of this application, the login request sent by the client may be received; then the at least two groups of corresponding network addresses are obtained based on the login account carried in the login request; it is determined, based on the lock region configuration corresponding to the login request and the at least two groups of network addresses, whether the client belongs to the lock region; and when the client does not belong to the lock region, login is performed based on the login request. In this case, the lock region configuration may be preset. When the login request is received, it is determined, based on the at least two groups of network addresses corresponding to the login account, whether the client belongs to the lock region corresponding to the login request, so that sensitive information of the user is not relied on compulsorily, increasing a success rate of lock region verification when the client requests to log in to a game. In addition, a developer can limit a game login region without configuring hardware and software code of the client in advance, greatly shortening a development cycle of the game.

DESCRIPTION OF EMBODIMENTS

Figure 1:
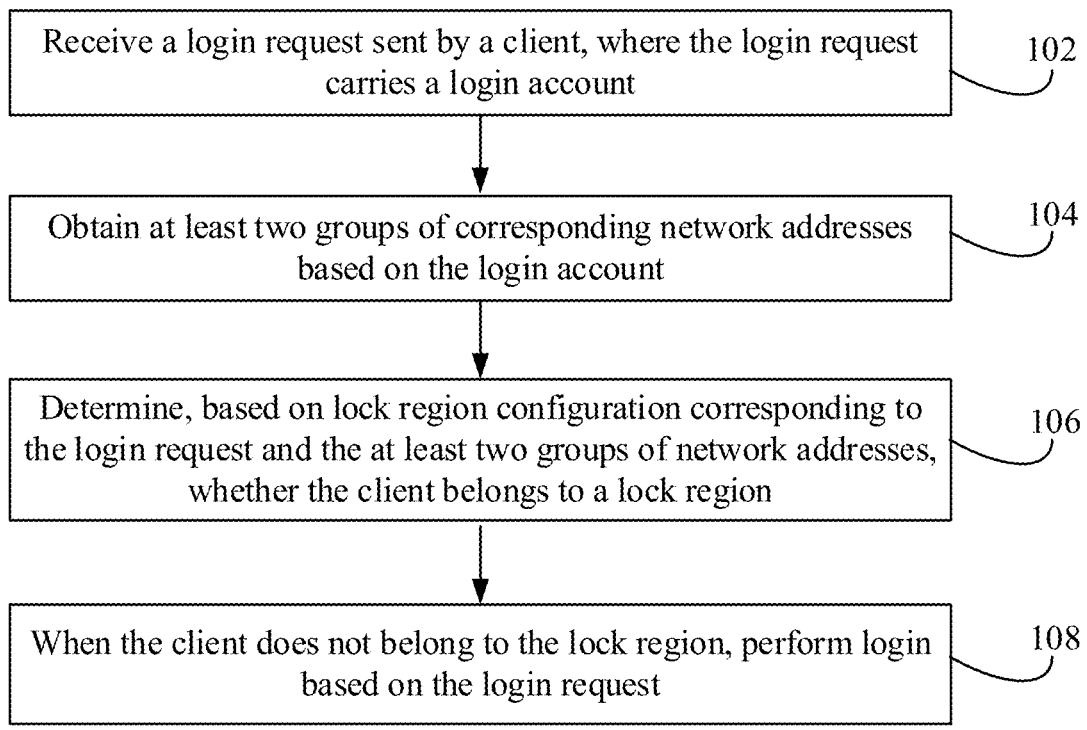
FIG. 1 is a flowchart of a game login method according to an embodiment of this application.

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a", "said", and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to differentiate between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

First, nouns related to one or more embodiments of this application are explained.

Lock region: Game consoles in a specific region can use a game disc and cassette only in the region. Nowadays, the lock region generally refers to a regional limitation of all games, and can limit a region in which a game can be logged in, or limit a region in which a game cannot be logged in. In embodiments of this application, the lock region defines one or more regions in which a game is not accessible by clients belonging to the lock region, that is, a client that belongs to a lock region of the game cannot log in to the game; and a client that does not belong to the lock region can log in to the game.

Console game: It is also referred to as a TV game, which includes two parts: a handheld game and a home console game. The console game is an interactive multimedia used for entertainment, and usually is a game that uses a TV screen as a display to execute a game of a home console on a TV.

DLC: is shorted for downloadable content. For a stand-alone game, the DLC is subsequent downloadable content of the game such as an expansion pack and modifications (MOD), which can be considered as additional content of the game.

In this application, a game login method is provided. This application simultaneously relates to a game login apparatus, a computing device, a computer-readable storage medium, and a computer program product. Details are described one by one in the following embodiments.

FIG. 1 is a flowchart of a game login method according to an embodiment of this application. The method specifically includes the following steps.

Step 102: Receive a login request for logging in to a game sent by a client computing device, i.e., a client, where the login request carries a login account.

In actual application, usually, a lock region of a game is mainly put forward by a console game, to ensure that a console game disc or cassette released in a region can be limited to be used only in the released region. As a game is released in different regions, users who play the game are distributed in different regions. Therefore, there are increasing demands for a lock region of the game, specific DLC, and a specific game mission. A conventional lock region is implemented using a physical lock or a geographical lock. In the physical lock manner, permission authentication is performed mainly by using hardware or software code, and in the geographical lock manner, a location of a client is determined through GPS positioning, to perform permission authentication. However, the physical lock manner relies on preparation of hardware and software resources before a game is released, and is less applicable to a mobile game with a short release cycle and a compact pace. However, in the geographical lock manner, a user needs to authorize GPS positioning. With increasingly strict personal data protection, for a user who does not want to authorize positioning information, a location of a client cannot be determined. Therefore, verification cannot be performed when the client requests to log in to the game.

Therefore, to shorten a development cycle of a game and increase a success rate of lock region verification when a client requests to log in to a game, the embodiments of this application provide a game login method. The login request sent by the client may be received; then at least two groups of corresponding network addresses are obtained based on the login account carried in the login request; it is determined, based on lock region configuration corresponding to the login request and the at least two groups of network addresses, whether the client belongs to the lock region; and when the client does not belong to the lock region, login is performed based on the login request. In this way, it is determined, based on the at least two groups of network addresses corresponding to the login account, whether the client belongs to the lock region corresponding to the login request, so that sensitive information of a user is not relied on compulsorily, and a developer can limit a game login region without configuring hardware and software code of the client in advance.

Specifically, the user may operate the client to initiate a login request, to request to log in to a game from a server, and DLC in the game or a mission in the game. Generally, each user has one login account used to identify an identity of the user. The user may enter the login account and a password on the client, and after clicking on "login", the user may initiate a login request to the server. The login request may carry the login account that needs to be logged in, where the login account may be a game identity (ID) of the user.

In an optional implementation of this embodiment, a configurator may pre-access the server and configure a game-related lock region in the server, that is, before the login request sent by the client is received, the method further includes:

receiving a request of configuring a lock region sent by the configurator, where the request of configuring the lock region carries a lock region configuration comprising information indicating the lock region and a corresponding lock object associated with a game that is restricted/prohibited from login by clients in the lock region; and storing the lock region configuration, the corresponding lock object associated with the game, and a corresponding relationship between them.

Specifically, the configurator is a game developer who needs to perform lock region configuration, and the lock region configuration request is a request triggered by the configurator by using a management device, and is used to pre-configure, in the server, a corresponding lock region for the lock region object. The lock region object is content that needs to be locked by the configurator, and the lock region object may be an entire game, or may be a game mission, a plot in a branch line, DLC, or the like in the game. The lock region configuration is a target region set for the lock region object, and is used to restrict a client in a target region from logging in to a corresponding lock region object.

In this embodiment of this application, the configurator may trigger the lock region configuration request to pre-configure, in the server, a corresponding lock region for the lock region object; the configurator may configure different lock regions for different games, or may configure different lock regions for different game missions, plots in different branch lines, or different DLC in a game, that is, may configure a custom lock region of a specific game mission or specific DLC according to needs. In this way, the configurator may determine, according to a requirement of an actual application scenario, whether granularity of lock region configuration is for an entire game, or for some content in the game, to achieve higher flexibility in configuring a lock region for related content of the game, which can adapt to different application scenarios. In addition, the configurator does not need to modify hardware and software of the client, that is, does not need to separately make another settings on the lock region, and only needs to senselessly access the server to perform lock region configuration. After the client initiates the login request, the login request may carry corresponding information, and the server performs lock region verification based on the information in the login request.

Step 104: Obtain at least two groups of corresponding network addresses based on the login account.

Specifically, on the basis of receiving the login request sent by the client, further, the corresponding at least two groups of network addresses are obtained based on the login account. The login account can identify the identity of the user, and therefore the at least two groups of network addresses when the user logs in to the game can be obtained based on the login account.

In an optional implementation of this embodiment, the obtaining at least two groups of corresponding network addresses based on the login account includes:

determining a current login address of the login account; and obtaining, from a historical record, at least one group of historical network addresses corresponding to the login account, where each group of historical network addresses includes a login address and a corresponding reporting heartbeat address.

It should be noted that, each time the user logs in to the game, one login address exists, and the server records each login address in the historical record. In addition, after the login succeeds, the client reports a heartbeat to the server in real time, to confirm a connection. Each time the client reports a heartbeat, the server also records a reporting heartbeat address. That is, after each login, the historical record stores a current login address and a plurality of corresponding reporting heartbeat addresses. Therefore, each group of historical network addresses includes one login address and a plurality of reporting heartbeat addresses corresponding to the login.

In addition, a quantity of groups of historical network addresses that need to be obtained may be preset to one group, two groups, or a plurality of groups. A larger quantity of groups of historical network addresses indicates more obtained historical network information, so that accuracy of subsequent lock region verification can be higher.

In a specific implementation, there are a plurality of implementations of obtaining, from the historical record, at least one group of historical network addresses corresponding to the login account. In a possible implementation, according to a login time axis, historical network addresses (obtained by using login time as reference) in the historical record are sequentially obtained at different time before current time until a required quantity of groups of historical network addresses are obtained. In another possible implementation, a time period between the first login time and current login time is divided, and one group of historical network addresses is randomly obtained in each time period. Certainly, in an actual implementation, the at least one group of historical network addresses may be obtained from the historical record in another manner. This is not limited in this embodiment of this application.

For example, the historical network addresses stored in the historical record are shown in the following table 1. It is assumed that time of receiving the login request is 11:00 on January 4, in other words, current login time is 11:00 on January 4, a current login address is not recorded in the historical record because of unsuccessful login this time. If five groups of historical network addresses need to be obtained, the third group, the fourth group, the fifth group, the sixth group, and the seventh group of historical network addresses may be sequentially obtained at different time before the current time according to the following table 1.

TABLE 1

Historical network addresses in the historical record

| Login time | Historical network address group identifier | Login address | Reporting heartbeat address |
|---|---|---|---|
| 10:00 on January 1 | First group | X1 | Y1, Y2, Y3 |
| 14:00 on January 1 | Second group | X2 | Y4, Y5 |
| 20:00 on January 1 | Third group | X3 | Y6, Y7, Y8, Y9 |
| 11:00 on January 2 | Fourth group | X4 | Y10, Y11, Y12 |
| 16:00 on January 2 | Fifth group | X5 | Y13, Y14 |
| 12:00 on January 3 | Sixth group | X6 | Y15 |
| 19:00 on January 3 | Seventh group | X7 | Y16, Y17, Y18, Y19 |

In this embodiment of this application, at least two groups of network addresses include a login address of the user's login this time, in other words, a current login address, and further include at least one group of historical network addresses. Each group of historical network addresses may include one login address and a reporting heartbeat address corresponding to the login, so that it is subsequently convenient to jointly determine, based on the current login address, a historical login address, and a corresponding historical reporting heartbeat address, whether the client is located in the lock region, to improve accuracy of lock region verification when the game is logged in.

In an optional implementation of this embodiment, after the obtaining, from a historical record, at least one group of historical network addresses corresponding to the login account, the method further includes:

determining whether the at least one group of historical network addresses is valid; and when an invalid historical network address exists in the at least one group of historical network addresses, deleting the invalid historical network address; and determining a deleted quantity of groups of deleted invalid historical network addresses, and continuing to obtain, from the historical record, historical network addresses of the deleted quantity of groups.

The determining whether the at least one group of historical network addresses is valid may be specifically implemented in the following process:

for each group of historical network addresses in the at least one group of historical network addresses, determining whether the login address and the corresponding reporting heartbeat address that are in the historical network addresses are in a same region; and when the login address and the corresponding reporting heartbeat address are in the same region, determining that the historical network addresses are valid; or when the login address and the corresponding reporting heartbeat address are not in the same region, determining that the historical network addresses are invalid.

It should be noted that, because each group of historical network addresses includes a login address and a corresponding reporting heartbeat address, and when the login address and the corresponding heartbeat reporting address are in a same region, it indicates that the user does not change a region in a game operation process, and the group of historical network addresses is valid historical data, which can be used to subsequently determine a lock region. Therefore, after the at least one group of historical network addresses is obtained, it is necessary to determine one by one whether each group of obtained historical network addresses is valid. If an invalid historical network address exists, the invalid historical network address may be deleted, and historical network addresses continues to be obtained at previous time, to ensure that all the obtained historical network addresses are valid historical network addresses.

The foregoing example is still used. It is assumed that reporting heartbeat addresses and login addresses in the third group and the fifth group of historical network addresses belong to different regions, that is, the third group and the fifth group of historical network addresses are invalid historical network addresses, the obtained third group and the obtained fifth group of historical network addresses are deleted, and the first group and the second group of historical network addresses continue to be sequentially obtained at previous time according to the foregoing Table 1.

In this embodiment of this application, after the at least one group of historical network addresses is obtained, an invalid historical network address in the at least one group of historical network addresses may be further deleted, to ensure validity of the historical network addresses, thereby ensuring accuracy of lock region verification.

In an optional implementation of this embodiment, the login request further carries a client identification code, before the obtaining at least two groups of corresponding network addresses based on the login account, the method further includes:

determining whether the client identification code is identification code in a preset whitelist; and when the client identification code is not the identification code in the preset whitelist, performing the operation step of obtaining at least two groups of corresponding network addresses based on the login account; or when the client identification code is the identification code in the preset whitelist, determining that the client does not belong to the lock region.

It should be noted that, in some stages (for example, a game test stage), login permission needs to be opened to a specific client, and the client with the login permission can perform login regardless of whether the client is located in the lock region. Therefore, in this embodiment of this application, a whitelist may be preset, and the whitelist stores the client identification code for which login to a game is allowed. After the login request is received, it may be first determined whether the client identification code carried in the login request belongs to the identification code in the preset whitelist. If yes, it indicates that the client belongs to a client with the login permission, and it is directly determined that the client does not belong to the lock region, and is allowed for login. That is, for the client in the whitelist, the lock region is determined without needing to obtain network information again.

Moreover, in addition to the client identification code, the whitelist may be further set for the login address, that is, a whitelist including a plurality of login addresses may be preset. After the login request is received, it is determined whether a current login address is a login address in the preset whitelist. If no, the operation step of obtaining at least two groups of corresponding network addresses based on the login account is performed; or if yes, it is determined that the client does not belong to the lock region.

In this embodiment of this application, the whitelist with the login permission may be preset. If it is determined that the client that initiates the login request belongs to a client in the whitelist, it may be directly determined that the client does not belong to the lock region, and has login permission, improving flexibility of lock region verification and verification efficiency.

In an optional implementation of this embodiment, before the obtaining at least two groups of corresponding network addresses based on the login account, the method further includes:

determining whether the lock region configuration corresponding to the login request is pre-stored locally; and if yes, performing the operation step of obtaining at least two groups of corresponding network addresses based on the login account; or if no, determining that the client does not belong to the lock region.

It should be noted that, before lock region verification is performed, a target object (a game, a game mission, DLC, or the like) to which the login request needs to log in may be alternatively determined, and it is determined whether the lock region configuration is preset in the server. If there is no lock region configuration, lock region verification does not need to be performed; or if there is lock region configuration, the subsequent operation step of lock region verification needs to be performed.

In addition, if the whitelist is set in the server, when it is determined that the lock region configuration corresponding to the login request is pre-stored locally, the operation step of determining whether the client identification code is an identification code in the preset whitelist may be performed, and then a result is determined based on the whitelist, to perform subsequent lock region verification.

Step 106: Determine, based on the lock region configuration corresponding to the game indicated in the login request and the at least two groups of network addresses, whether the client belongs to the lock region.

Specifically, on the basis of the obtaining at least two groups of corresponding network addresses based on the login account, further, it is determined, based on the lock region configuration corresponding to the login request and the at least two groups of network addresses, whether the client belongs to the lock region. The lock region configuration corresponding to the game indicated in the login request refers to a lock region set corresponding to the game comprising a login object, i.e., an object to which the login request requests to log in.

Therefore, the login request may further carry information indicative of the game comprising the login object. In this way, before the determining, based on the lock region configuration corresponding to the login request and the at least two groups of network addresses, whether the client belongs to the lock region, the lock region configuration corresponding to the login request may be alternatively obtained first based on the login object.

In this embodiment of this application, the configurator may configure different lock regions for different games, or may configure different lock regions for different game missions, plots in different branch lines, or different DLC in a game, that is, may configure a custom lock region of a specific game mission or specific DLC according to needs. Therefore, when the login request is received, lock region configuration set for the login object (namely, a lock region object) by the configurator is determined based on the login object carried in the login request, so that a login region of the login object can be subsequently limited, to implement a regional limitation at a different granularity.

In an optional implementation of this embodiment, the determining, based on the lock region configuration corresponding to the login request and the at least two groups of network addresses, whether the client belongs to the lock region includes:

determining whether the at least two groups of historical network addresses belong to the lock region;

counting a first proportion of network addresses that belong to the lock region and that are in the at least two groups of network addresses; and when the first proportion is less than or equal to a first threshold, determining that the client does not belong to the lock region; when the first proportion is greater than or equal to a second threshold, determining that the client belongs to the lock region; or when the first proportion is greater than a first threshold and less than a second threshold, obtaining device information of the client, and determining, based on the device information of the client, whether the client belongs to the lock region.

It should be noted that the first threshold and the second threshold are preset values, and are used to determine a quantity of network addresses that belong to the lock region and that are in the at least two groups of network addresses. The second threshold is greater than the first threshold. If the first proportion of network addresses that belong to the lock region and that are in the at least two groups of network addresses is less than or equal to the first threshold, it indicates that most of the obtained network addresses do not belong to the lock region, and in this case, it may be directly determined that the client does not belong to the lock region; if the first proportion of network addresses that belong to the lock region and that are in the at least two groups of network addresses is greater than or equal to the second threshold, it indicates that most of the obtained network addresses belong to the lock region, and in this case, it may be directly determined that the client belongs to the lock region; or if the first proportion of network addresses that belong to the lock region and that are in the at least two groups of network addresses is greater than the first threshold and less than the second threshold, it indicates that a part of the obtained network addresses belong to the lock region, the other part of the obtained network addresses do not belong to the lock region, and there is no obvious difference between quantities. In this case, it cannot be directly determined whether the client belongs to the lock region, and further, it may be determined, based on device information of the client, whether the client belongs to the lock region.

The determining, based on the device information of the client, whether the client belongs to the lock regions may be specifically implemented in the following process:

determining whether the device information of the client includes a device region; and when the device information of the client includes the device region, if the device region belongs to the lock region, determining that the client belongs to the lock region; or if the device region does not belong to the lock region, determining that the client does not belong to the lock region; or when the device information of the client does not include the device region, determining whether the device information of the client includes language information; and if the device information of the client includes the language information, when a language indicated by the language information belongs to a language corresponding to the lock region, determining that the client belongs to the lock region, or when a language indicated by the language information does not belong to a language corresponding to the lock region, determining that the client does not belong to the lock region.

It should be noted that the client may request user authorization, to obtain device region information. If the user authorization is obtained, the client can successfully obtain the device region information, and in this case, the login request initiated by the client may carry the device region information for lock region verification; or if the user authorization is not obtained, the client may not obtain the device region information, but may perform lock region verification based on the language information of the device. Because a use language is necessarily set in the client, the client may add language information of the use language into the login request, so that the server can determine, based on the language information of the device, a region in which the user using the client is located, to determine whether the client belongs to the lock region. In this way, in a case of information loss, lock region verification may be performed by using corresponding degraded logic, to ensure a success rate of lock region verification, thereby ensuring a success rate of game login.

In addition, when the first proportion is less than or equal to the first threshold, and the first proportion is greater than or equal to the second threshold, a further determining step may be alternatively performed, and then it is determined whether the client belongs to the lock region. A specific implementation process may be as follows:

when the first proportion is less than or equal to the first threshold, if neither of the at least two groups of network addresses belongs to the lock region, determining that the client does not belong to the lock region; or if the at least two groups of network addresses include network addresses that belong to the lock region, obtaining the device information of the client, and determining, based on the device information of the client, whether the client belongs to the lock region; or when the first proportion is greater than or equal to the second threshold, if a current login address belongs to the lock region, and at least one group of historical network addresses belongs to the lock region, determining that the client belongs to the lock region; if a current login address does not belong to the lock region, obtaining device information of the client, and determining, based on the device information of the client, whether the client belongs to the lock region; or if a current login address belongs to the lock region, and at least one group of historical network addresses includes historical network addresses that do not belong to the lock region, obtaining device information of the client, and determining, based on the device information of the client, whether the client belongs to the lock region.

It should be noted that, in this embodiment of this application, when neither of the at least two groups of network addresses belongs to the lock region, it may be determined that the client does not belong to the lock region. If the at least two groups of network addresses include network addresses that belong to the lock region, lock region verification may be further performed based on the device information of the client. In addition, when the current login address belongs to the lock region, and the at least one group of historical network addresses belongs to the lock region, it may be determined that the client belongs to the lock region. Otherwise, lock region verification may be further performed based on the device information of the client, to ensure accuracy of lock region verification and avoid misjudgment.

Figure 2:
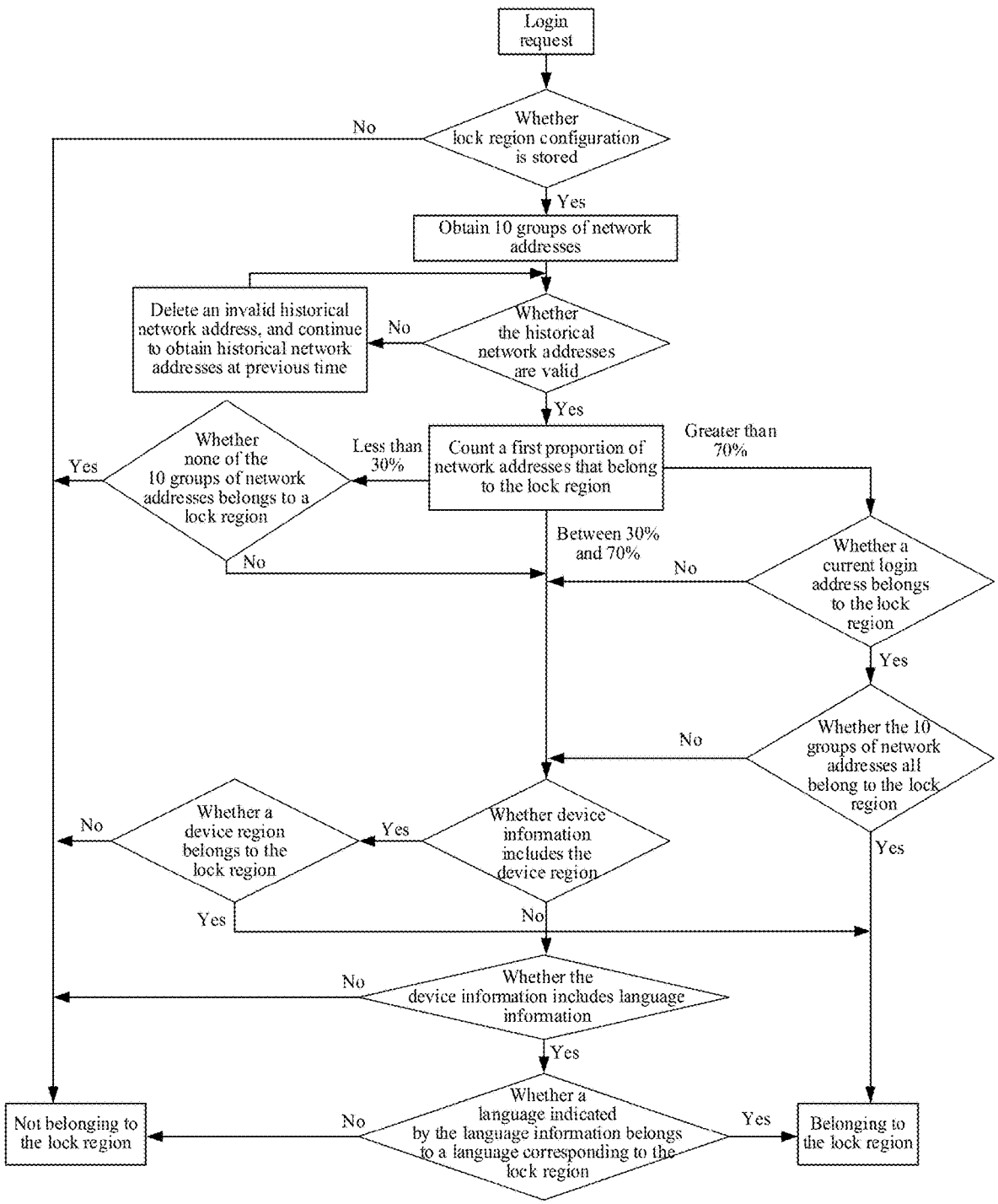
FIG. 2 is a flowchart of lock region verification according to an embodiment of this application.

FIG. 2 is a flowchart of lock region verification according to an embodiment of this application. With reference to FIG. 2, the following describes a specific process of lock region verification shown in step 102 to step 106 by using an example.

As shown in FIG. 2, when the login request is received, it is determined whether the lock region configuration corresponding to the login request is pre-stored locally. If no, it is determined that the client does not belong to the lock region; or if yes, 10 groups of network addresses (a current login address and nine groups of historical network addresses) are obtained, and then it is determined whether the historical network addresses are valid. If no, the invalid network addresses are deleted, and historical network addresses continue to be obtained at previous time according to a time axis, to supplement the network addresses to be 10 groups, and continue to determine validity of the historical network addresses; or if yes, the first proportion of network addresses that belong to the lock region and that are in the 10 groups of network addresses is counted.

When the first proportion is less than (or equal to) 30%, it is determined whether none of the groups of network addresses belongs to the lock region. If yes, it is determined that the client does not belong to the lock region; or if no, it is determined whether the device information of the client includes the device region. When the first proportion is greater than (or equal to 70%), it is determined whether the current login address belongs to the lock region. If yes, it is further determined whether all the 10 groups of network addresses belong to the lock region, and if yes, it is determined that the client belongs to the lock region, or if no, it is further determined whether the device information of the client includes the device region; or if no, it is determined whether the device information of the client includes the device region.

When the first proportion is greater than 30% and less than 70%, it is determined whether the device information of the client includes the device region. If yes, it is determined whether the device region belongs to the lock region, and if the device region belongs to the lock region, it is determined that the client belongs to the lock region; or if the device region does not belong to the lock region, it is determined that the client does not belong to the lock region. If no, it is determined whether the device information of the client includes language information. If the device information of the client includes language information, it is determined whether a language indicated by the language information belongs to a language corresponding to the lock region; and if yes, it is determined that the client belongs to the lock region, or if no, it is determined that the client does not belong to the lock region; or if the device information of the client does not include the language information, it is determined that the client does not belong to the lock region.

Step 108: When the client does not belong to the lock region, perform login based on the login request.

Specifically, on the basis of the determining, based on the lock region configuration corresponding to the login request and the at least two groups of network addresses, whether the client belongs to the lock region, further, when the client does not belong to the lock region, login is performed based on the login request. It should be noted that, if it is determined that the client does not belong to the lock region, it indicates that the client is not in a limited region and can normally log in to a game. In this case, a corresponding login object may be logged in based on the login request.

In an optional implementation of this embodiment, after the performing login based on the login request, the method further includes:

obtaining a reporting heartbeat address of the client; and
recording, in the historical record, a current login address and the reporting heartbeat address.

It should be noted that, after the game is normally logged in, a heartbeat address reported by the client in real time may be further obtained, and a login address and a reporting heartbeat address corresponding to the login are recorded in the historical record, to perform lock region verification during subsequent login.

Figure 3:
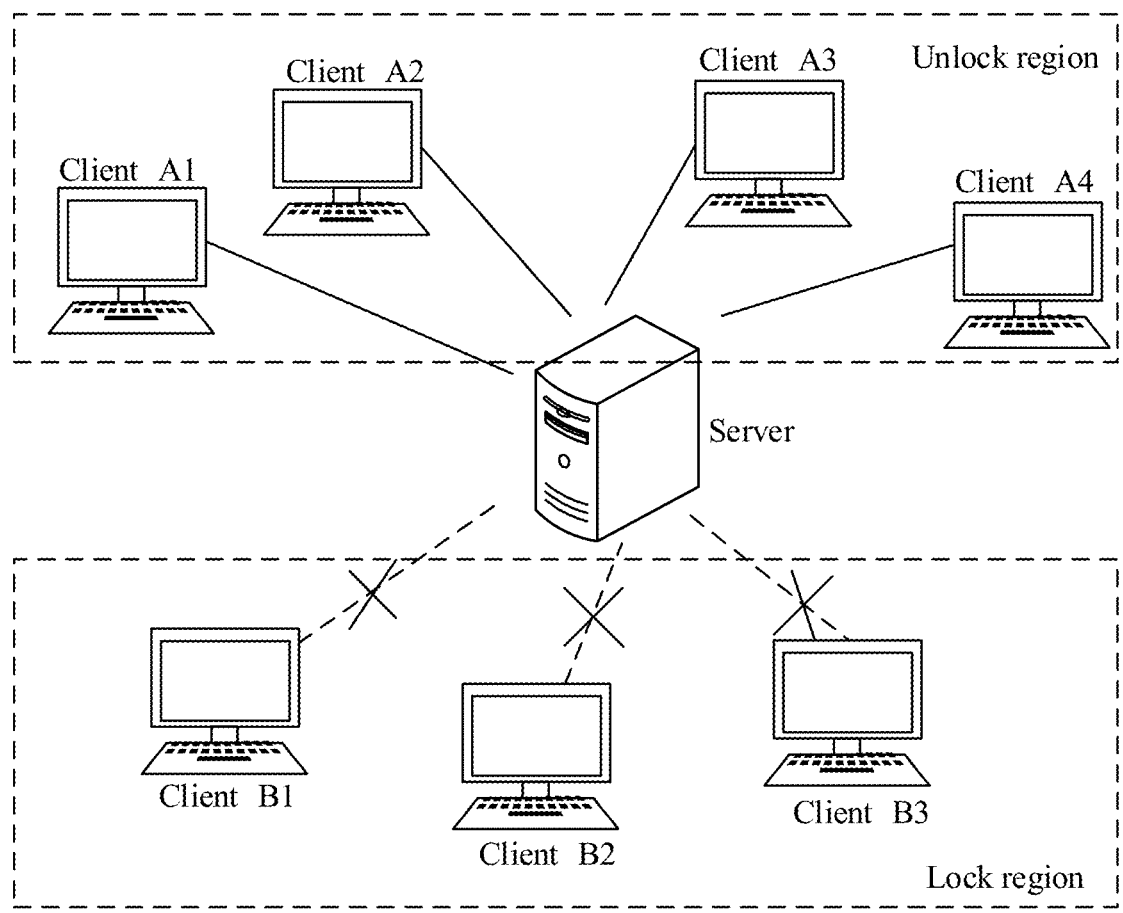
FIG. 3 is a scenario diagram of a client and a server according to an embodiment of this application.

FIG. 3 is a scenario diagram of a client and a server according to an embodiment of this application. As shown in FIG. 3, a client A1, a client A2, a client A3, and a client A4 do not belong to the lock region, so that the client A1, the client A2, the client A3, and the client A4 can normally establish a connection to the server, and log in to the game. However, a client B1, a client B2, and a client B3 belong to the lock region, and cannot log in to the game.

According to the game login method provided in the embodiments of this application, the login request sent by the client may be received; then the at least two groups of corresponding network addresses are obtained based on the login account carried in the login request; it is determined, based on the lock region configuration corresponding to the login request and the at least two groups of network addresses, whether the client belongs to the lock region; and when the client does not belong to the lock region, login is performed based on the login request. In addition, the configurator may trigger the lock region configuration request to pre-configure, in the server, a corresponding lock region for the lock region object, so that the configurator can configure a custom lock region of a specific game mission or specific DLC according to needs, to achieve higher flexibility in configuring a lock region for related content of the game, which can adapt to different application scenarios. In addition, the configurator does not need to modify hardware and software of the client, that is, does not need to separately make another settings on the lock region, and only needs to senselessly access the server to perform lock region configuration. After the client initiates the login request, the login request may carry corresponding information, and the server performs lock region verification based on the information in the login request. Furthermore, during lock region verification, lock region verification may be performed based on the network information corresponding to the login account and the device information of the client or only based on the network information, so that sensitive information of the user is not relied on compulsorily. In a case of information loss, lock region verification may be performed by using corresponding degraded logic, increasing a success rate of lock region verification when the client requests to log in to the game.

Figure 4:
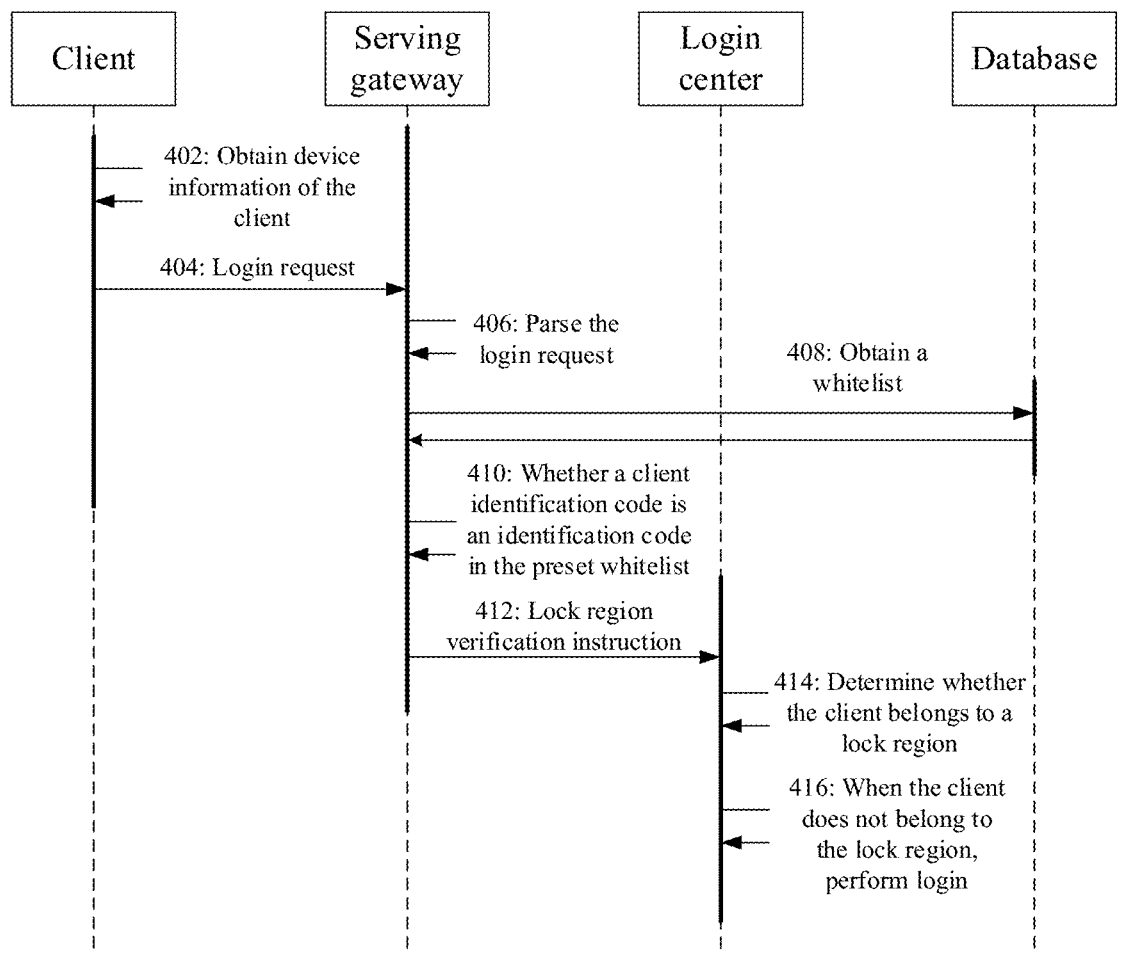
FIG. 4 is an interaction diagram of a game login method according to an embodiment of this application.

FIG. 4 is an interaction diagram of a game login method according to an embodiment of this application. The method specifically includes the following steps:

Step 402: A client requests user authorization, and when the user authorization is obtained, obtains device information of the client, where the device information includes a device region and language information.

It should be noted that the device region of the client belongs to sensitive information, and therefore user authorization needs to be requested. If the user authorization is obtained, the device region of the client may be obtained. In this case, the device information includes the device region and the language information. However, a use language is necessarily set in the client, and the language information of the client does not belong to sensitive information of the user, so that the client can directly obtain the language information. Therefore, if the user authorization is not obtained, the device region of the client cannot be obtained. In this case, the device information includes the language information.

Step 404: The client sends a login request to a serving gateway of a server, where the login request carries a login account, a client identification code, and the device information.

Step 406: The serving gateway of the server parses the login request, to obtain the login account, the client identification code, and the device information that are carried in the login request.

Step 408: The serving gateway of the server obtains a preset whitelist from a database.

Step 410: The serving gateway of the server determines whether the client identification code carried in the login request is an identification code in the whitelist.

Step 412: When determining that the client identification code is not the identification code in the preset whitelist, the serving gateway of the server sends a lock region verification instruction to a login center of the server.

Step 414: The login center of the server obtains at least two groups of network addresses corresponding to the login account, and determines, based on the network addresses and the device information, whether the client belongs to the lock region.

It should be noted that, the step of determining, based on the network addresses and the device information, whether the client belongs to the lock region is similar to the specific implementation process of determining whether the client belongs to the lock region in the foregoing embodiment, and reference may be made to related descriptions in the foregoing embodiment. This is not limited in this application.

Step 416: When the client does not belong to the lock region, the login center of the server performs login based on the login account and records a login address.

In this embodiment of this application, the whitelist with login permission may be preset. If it is determined that the client that initiates the login request does not belong to a client in the whitelist, lock region verification is further performed, to improve flexibility of lock region verification and verification efficiency. In addition, the configurator does not need to modify hardware and software of the client, that is, does not need to separately make another settings on the lock region, and only needs to senselessly access the server to perform lock region configuration. After the client initiates the login request, the login request may carry corresponding information, and the server performs lock region verification based on the information in the login request.

Figure 5:
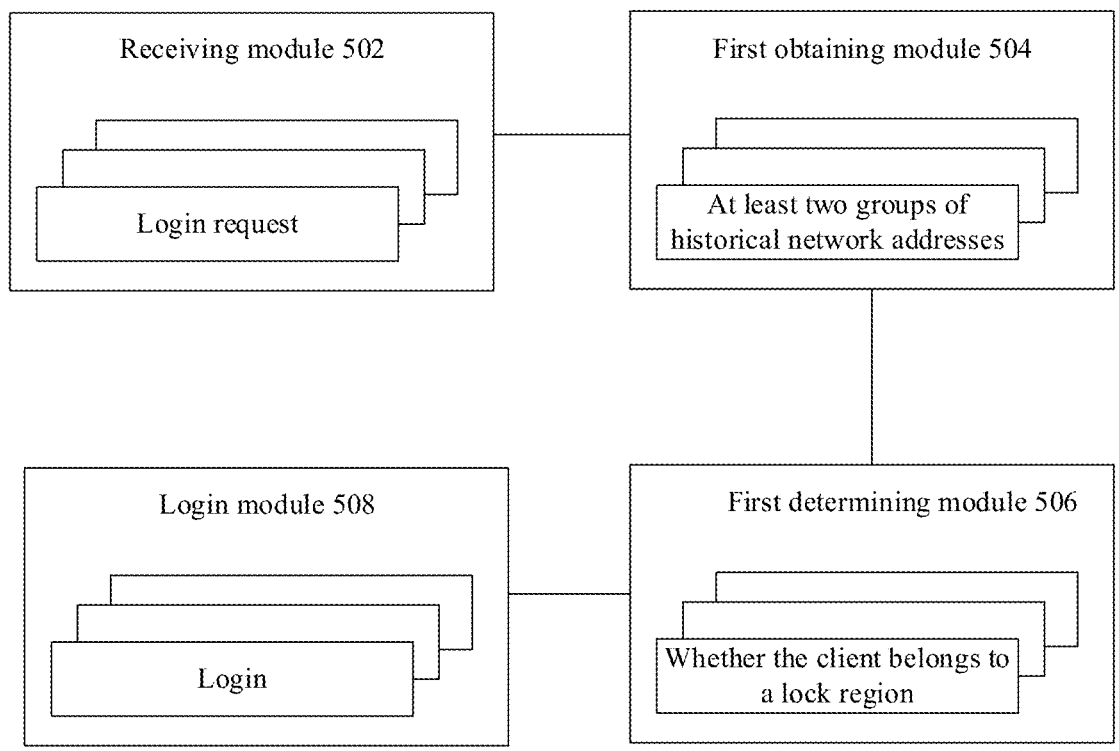
FIG. 5 is a schematic diagram of a structure of a game login apparatus according to an embodiment of this application.

This application further provides a game login apparatus embodiment corresponding to the foregoing method embodiments. FIG. 5 is a schematic diagram of a structure of a game login apparatus according to an embodiment of this application. As shown in FIG. 5, the apparatus includes:

a receiving module 502, configured to receive a login request sent by a client, where the login request carries a login account;

a first obtaining module 504, configured to obtain at least two groups of corresponding network addresses based on the login account;

a first determining module 506, configured to determine, based on lock region configuration corresponding to the login request and the at least two groups of network addresses, whether the client belongs to a lock region; and a login module 508, configured to: when the client does not belong to the lock region, perform login based on the login request.

Optionally, the first obtaining module 504 is further configured to:

determine a current login address of the login account; and obtain, from a historical record, at least one group of historical network addresses corresponding to the login account, where each group of historical network addresses includes a login address and a corresponding reporting heartbeat address.

Optionally, the first obtaining module 504 is further configured to:

determine whether the at least one group of historical network addresses is valid; and when an invalid historical network address exists in the at least one group of historical network addresses, delete the invalid historical network address; and determine a deleted quantity of groups of deleted invalid historical network addresses, and continue to obtain, from the historical record, historical network addresses of the deleted quantity of groups.

Optionally, the first obtaining module 504 is further configured to:

for each group of historical network addresses in the at least one group of historical network addresses, determine whether the login address and the corresponding reporting heartbeat address that are in the historical network addresses are in a same region; and when the login address and the corresponding reporting heartbeat address are in a same region, determine that the historical network addresses are valid; or when the login address and the corresponding reporting heartbeat address are not in a same region, determine that the historical network addresses are invalid.

Optionally, the first determining module 506 is further configured to:

determine whether the at least two groups of historical network addresses belong to the lock region;

count a first proportion of network addresses that belong to the lock region and that are in the at least two groups of network addresses; and when the first proportion is less than or equal to a first threshold, determine that the client does not belong to the lock region; when the first proportion is greater than or equal to a second threshold, determine that the client belongs to the lock region; or when the first proportion is greater than a first threshold and less than a second threshold, obtain device information of the client, and determine, based on the device information of the client, whether the client belongs to the lock region.

Optionally, the first determining module 506 is further configured to:

determine whether the device information of the client includes a device region; and when the device information of the client includes the device region, if the device region belongs to the lock region, determine that the client belongs to the lock region; or if the device region does not belong to the lock region, determine that the client does not belong to the lock region; or when the device information of the client does not include the device region, determine whether the device information of the client includes language information; and if the device information of the client includes the language information, when a language indicated by the language information belongs to a language corresponding to the lock region, determine that the client belongs to the lock region, or when a language indicated by the language information does not belong to a language corresponding to the lock region, determine that the client does not belong to the lock region.

Optionally, the login request further carries a client identification code, and the apparatus further includes:

a second determining module, configured to determine whether the client identification code is an identification code in a preset whitelist; and when the client identification code is not the identification code in the preset whitelist, execute the first obtaining module 504; or when the client identification code is the identification code in the preset whitelist, determine that the client does not belong to the lock region.

Optionally, the apparatus further includes:

a third determining module, configured to determine whether the lock region configuration corresponding to the login request is pre-stored locally; and if yes, execute the first obtaining module 504; or if no, determine that the client does not belong to the lock region.

Optionally, the apparatus further includes:

a receiving module, configured to receive a lock region configuration request sent by a configurator, where the lock region configuration request carries a lock region object and lock region configuration; and a storage module, configured to correspondingly store the lock region object and the lock region configuration.

Optionally, the login request further carries a login object, and the apparatus further includes:

a second obtaining module, configured to obtain, based on the login object, the lock region configuration corresponding to the login request.

Optionally, the apparatus further includes:

a third obtaining module, configured to obtain a reporting heartbeat address of the client; and a recording module, configured to record, in the historical record, a current login address and the reporting heartbeat address.

According to the game login apparatus provided in this embodiment of this application, the configurator may trigger the lock region configuration request to pre-configure, in the server, a corresponding lock region for the lock region object, so that the configurator can configure a custom lock region of a specific game mission or specific DLC according to needs, to achieve higher flexibility in configuring a lock region for related content of the game, which can adapt to different application scenarios. In addition, the configurator does not need to modify hardware and software of the client, that is, does not need to separately make another settings on the lock region, and only needs to senselessly access the server to perform lock region configuration. After the client initiates the login request, the login request may carry corresponding information, and the server performs lock region verification based on the information in the login request. Furthermore, during lock region verification, lock region verification may be performed based on the network information corresponding to the login account and the device information of the client or only based on the network information, so that sensitive information of the user is not relied on compulsorily. In a case of information loss, lock region verification may be performed by using corresponding degraded logic, increasing a success rate of lock region verification when the client requests to log in to the game.

The foregoing describes the schematic solution of the game login apparatus in this embodiment. It should be noted that the technical solution of the game login apparatus and the technical solution of the foregoing game login method belong to a same concept. For details not described in detail in the technical solution of the game login apparatus, refer to the descriptions of the technical solution of the foregoing game login method.

Figure 6:
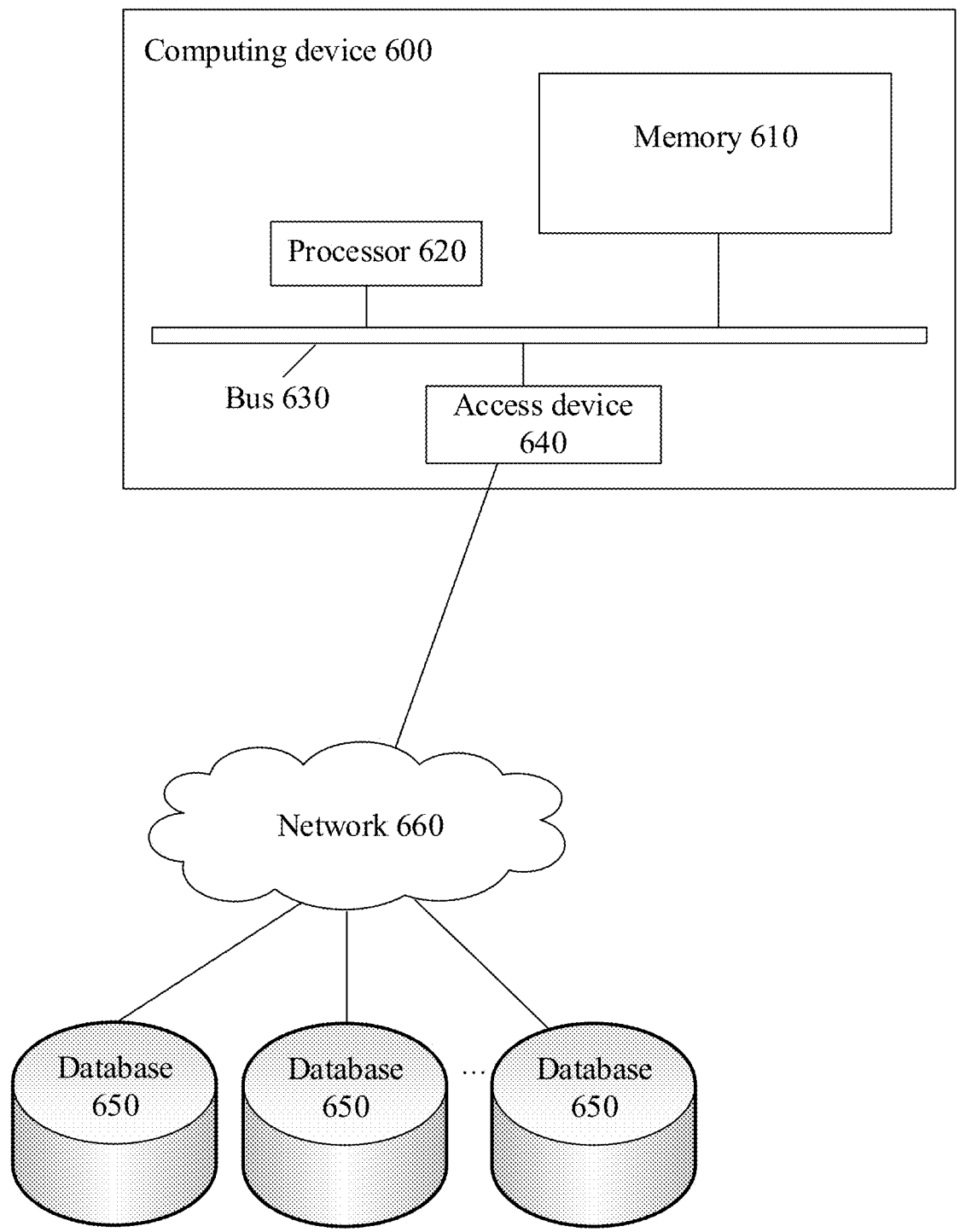
FIG. 6 is a block diagram of a structure of a computing device according to an embodiment of this application.

FIG. 6 is a block diagram of a structure of a computing device 600 according to an embodiment of this application. Components of the computing device 600 include but are not limited to a memory 610 and a processor 620. The processor 620 and the memory 610 are connected by using a bus 630, and a database 650 is configured to store data.

The computing device 600 further includes an access device 640. The access device 640 enables the computing device 600 to communicate by using one or more networks 660. Examples of these networks include a public switched telephone network (PSTN), a local area network (LAN), a wide area network (WAN), a personal area network (PAN), or a combination of communication networks such as the Internet. The access device 640 may include one or more of any type of network interface (for example, a network interface card (NIC)) that is wired or wireless, for example, an IEEE802.11 wireless local area network (WLAN) wireless interface, a worldwide interoperability for microwave access (Wi-MAX) interface, an Ethernet interface, a universal serial bus (USB) interface, a cellular network interface, a Bluetooth interface, or a near field communication (NFC) interface.

In an embodiment of this application, the foregoing components of the computing device 600 and other components not shown in FIG. 6 may be alternatively connected to each other, for example, by using the bus. It should be understood that the block diagram of the structure of the computing device shown in FIG. 6 is merely used as an example instead of a limitation on the scope of this application. A person skilled in the art may add or replace other components as required.

The computing device 600 may be any type of still or mobile computing device, including: a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses); another type of mobile device; or a still computing device such as a desktop computer or a PC. The computing device 600 may be alternatively a mobile or still server.

The processor 620 is configured to execute the following computer executable instructions:
  receiving a login request sent by a client, where the login request carries a login account;
  obtaining at least two groups of corresponding network addresses based on the login account;
  determining, based on lock region configuration corresponding to the login request and the at least two groups of network addresses, whether the client belongs to a lock region; and
  when the client does not belong to the lock region, performing login based on the login request.

The foregoing describes the schematic solution of the computing device in this embodiment. It should be noted that the technical solution of the computing device and the technical solution of the foregoing game login method belong to a same concept. For details not described in detail in the technical solution of the computing device, refer to the descriptions of the technical solution of the foregoing game login method.

An embodiment of this application further provides a computer-readable storage medium. The computer-readable storage medium stores computer instructions, and the computer instructions are executed by a processor to implement the steps of the foregoing game login method.

The foregoing describes the schematic solution of the computer-readable storage medium in this embodiment. It should be noted that the technical solution of the storage medium and the technical solution of the foregoing game login method belong to a same concept. For details not described in detail in the technical solution of the storage medium, refer to the descriptions of the technical solution of the foregoing game login method.

An embodiment of this application further provides a computer program product. When the computer program product is executed in a computer, the computer is enabled to perform any of the steps of the foregoing game login method.

The foregoing describes the schematic solution of the computer program product in this embodiment. It should be noted that the technical solution of the computer program product and the technical solution of the foregoing game login method belong to a same concept. For details not described in detail in the technical solution of the computer program product, refer to the descriptions of the technical solution of the foregoing game login method.

Specific embodiments of this application are described above. Other embodiments fall within the scope of the appended claims. In some cases, the actions or steps recorded in the claims can be performed in an order different from the order in embodiments and the desired results can still be achieved. In addition, the process depicted in the accompanying drawings does not necessarily require the shown particular order or consecutive order to achieve the desired results. In some implementations, multi-task processing and parallel processing can or may be advantageous.

The computer executable instructions include computer program code. The computer program code may be in a source code form, an object code form, an executable file form, an intermediate form, or the like. The computer-readable storage medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program code. It should be noted that content included in the computer-readable storage medium may be appropriately added or deleted according to the demands of legislation and patent practice in a jurisdiction, for example, in some jurisdictions, according to legislation and patent practice, the computer-readable storage medium includes neither the electrical carrier signal nor the telecommunications signal.

It should be noted that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in this application are all example embodiments, and related actions and modules are not necessarily mandatory to this application.

In the foregoing embodiments, descriptions of the embodiments have respective focuses. For a part that is not described in detail in an embodiment, refer to related descriptions in another embodiment.

The example embodiments of this application disclosed above are merely intended to help describe this application. The optional embodiments do not describe all details, and the present invention is not limited to the specific implementations. Clearly, many modifications and changes may be made based on the content of this application. These embodiments are selected and specifically described in this application to better explain the principle and the actual application of this application, so that a person skilled in the art can better understand and use this application. This application is only subjected to the claims and the scope and equivalents thereof.

What is claimed is:

1. A game login method, comprising:
    receiving a login request for logging into a game sent by a client computing device, wherein the login request carries a login account;
    determining at least two groups of corresponding network addresses based on the login account;
    determining whether the client computing device belongs to a lock region based on a lock region configuration corresponding to the game and the at least two groups of corresponding network addresses, wherein the lock region indicates one or more regions in which at least a part of the game is not accessible by client computing devices belonging to the lock region; and
    in response to determining that the client device does not belong to the lock region, performing login based on the login request.

2. The game login method according to claim 1, wherein the determining at least two groups of corresponding network addresses based on the login account comprises:
    determining a current login address of the login account; and
    obtaining, from a historical record, at least one group of historical network addresses corresponding to the login account, wherein each group of historical network addresses comprises a login address and a corresponding reporting heartbeat address.

3. The game login method according to claim 2, wherein the obtaining, from a historical record, at least one group of historical network addresses corresponding to the login account further comprises:
    determining whether the at least one group of historical network addresses is valid;
    in response to determining that a group of invalid historical network addresses exists in the at least one group of historical network addresses, deleting the group of invalid historical network addresses; and
    determining a number of groups of invalid historical network addresses that are deleted, and continuing to obtain the same number of groups of historical network addresses from the historical record.

4. The game login method according to claim 3, wherein the determining whether the at least one group of historical network addresses is valid comprises:
    determining whether the login address and the corresponding reporting heartbeat address comprised in each group of historical network addresses are in a same region;
    in response to determining that the login address and the corresponding reporting heartbeat address are in the same region, determining that a corresponding group of historical network addresses is valid; and
    in response to determining that the login address and the corresponding reporting heartbeat address are not in the same region, determining that the corresponding group of historical network addresses is invalid.

5. The game login method according to claim 1, wherein the determining whether the client computing device belongs to a lock region based on a lock region configuration corresponding to the game and the at least two groups of corresponding network addresses comprises:
    determining whether each of the at least two groups of corresponding network addresses belongs to the lock region;
    computing a first proportion of one or more groups of network addresses belonging to the lock region in the at least two groups of corresponding network addresses; and
    determining that the client computing device does not belong to the lock region when the first proportion is less than or equal to a first threshold;
    determining that the client computing device belongs to the lock region when the first proportion is greater than or equal to a second threshold;
    obtaining device information of the client computing device when the first proportion is greater than a first threshold and less than a second threshold; and
    determining whether the client computing device belongs to the lock region based on the device information.

6. The game login method according to claim 5, wherein the determining whether the client computing device belongs to the lock region based on the device information comprises:
    determining whether the device information comprises a device region;
    when the device information comprises the device region, determining that the client computing device belongs to the lock region in response to determining the device region belongs to the lock region, and determining that the client computing device does not belong to the lock region in response to determining that the device region does not belong to the lock region;
    when the device information does not comprise the device region, determining whether the device information comprises language information; and
    when the device information comprises the language information, determining that the client computing device belongs to the lock region in response to determining that a language indicated by the language information belongs to a language corresponding to the lock region, and determining that the client computing device does not belong to the lock region in response to determining that the language indicated by the language information does not belong to the language corresponding to the lock region.

7. The game login method according to claim 1, wherein the login request further carries a client identification code associated with the client computing device, and wherein before the determining at least two groups of corresponding network addresses based on the login account, the game login method further comprises:
    determining whether the client identification code is an identification code in a preset whitelist;
    in response to determining that the client identification code is not in the preset whitelist, performing the determining at least two groups of corresponding network addresses based on the login account; and in response to determining that the client identification code is in the preset whitelist, determining that the client computing device does not belong to the lock region.

8. The game login method according to claim 1, wherein before the determining at least two groups of corresponding network addresses based on the login account, the game login method further comprises:

determining whether the lock region configuration is pre-stored locally; and in response to determining that the lock region configuration is pre-stored locally, performing the determining at least two groups of corresponding network addresses based on the login account; and in response to determining that the lock region configuration is not pre-stored locally, determining that the client computing device does not belong to the lock region.

9. The game login method according to claim 1, wherein before the receiving a login request for logging into a game sent by a client computing device, the game login method further comprises:

receiving a request of configuring the lock region sent by a configurator, wherein the request of configuring the lock region carries the lock region configuration and information indicative of a corresponding lock object associated with the game that is restricted from login; and storing the lock region configuration, the corresponding lock object associated with the game, and a corresponding relationship between them.

10. The game login method according to claim 1, wherein the login request further carries information indicative of the game comprising an object for login, and wherein before the determining whether the client computing device belongs to a lock region based on a lock region configuration corresponding to the game and the at least two groups of corresponding network addresses, the game login method further comprises:

determining the lock region configuration based on the information indicative of the game comprising the object for login carried in the login request.

11. The game login method according to claim 1, wherein after the performing login based on the login request, the game login method further comprises:

obtaining a reporting heartbeat address of the client computing device; and recording, in a historical record, the reporting heartbeat address and a current login address of the client computing device.

12. A computing device, comprising:

a memory and a processor, wherein the memory is configured to store computer executable instructions, and the processor is configured to execute the computer executable instructions to implement operations comprising:

receiving a login request for logging into a game sent by a client computing device, wherein the login request carries a login account;

determining at least two groups of corresponding network addresses based on the login account;

determining whether the client computing device belongs to a lock region based on a lock region configuration corresponding to the game and the at least two groups of corresponding network addresses, wherein the lock region indicates one or more regions in which at least a part of the game is not accessible by client computing devices belonging to the lock region; and in response to determining that the client device does not belong to the lock region, performing login based on the login request.

13. The computing device according to claim 12, wherein the determining at least two groups of corresponding network addresses based on the login account comprises:

determining a current login address of the login account; and obtaining, from a historical record, at least one group of historical network addresses corresponding to the login account, wherein each group of historical network addresses comprises a login address and a corresponding reporting heartbeat address.

14. The computing device according to claim 12, wherein the determining whether the client computing device belongs to a lock region based on a lock region configuration corresponding to the game and the at least two groups of corresponding network addresses comprises:

determining whether each of the at least two groups of corresponding network addresses belongs to the lock region;

computing a first proportion of one or more groups of network addresses belonging to the lock region in the at least two groups of corresponding network addresses; and determining that the client computing device does not belong to the lock region when the first proportion is less than or equal to a first threshold;

determining that the client computing device belongs to the lock region when the first proportion is greater than or equal to a second threshold;

obtaining device information of the client computing device when the first proportion is greater than a first threshold and less than a second threshold; and determining whether the client computing device belongs to the lock region based on the device information.

15. The computing device according to claim 12, wherein before the determining at least two groups of corresponding network addresses based on the login account, the operations further comprise:

determining whether the lock region configuration is pre-stored locally; and in response to determining that the lock region configuration is pre-stored locally, performing the determining at least two groups of corresponding network addresses based on the login account; and in response to determining that the lock region configuration is not pre-stored locally, determining that the client computing device does not belong to the lock region.

16. The computing device according to claim 12, wherein before the receiving a login request for logging into a game sent by a client computing device, the operations further comprise:

receiving a request of configuring the lock region sent by a configurator, wherein the request of configuring the lock region carries the lock region configuration and information indicative of a corresponding lock object associated with the game that is restricted from login; and storing the lock region configuration, the corresponding lock object associated with the game, and a corresponding relationship between them.

17. A non-transitory computer-readable storage medium, wherein the computer-readable storage medium stores computer instructions, and the computer instructions are executable by a processor to implement operations comprising:
receiving a login request for logging into a game sent by a client computing device, wherein the login request carries a login account;
determining at least two groups of corresponding network addresses based on the login account;
determining whether the client computing device belongs to a lock region based on a lock region configuration corresponding to the game and the at least two groups of corresponding network addresses, wherein the lock region indicates one or more regions in which at least a part of the game is not accessible by client computing devices belonging to the lock region; and
in response to determining that the client device does not belong to the lock region, performing login based on the login request.

18. The non-transitory computer-readable storage medium according to claim 17, wherein the determining at least two groups of corresponding network addresses based on the login account comprises:
determining a current login address of the login account; and
obtaining, from a historical record, at least one group of historical network addresses corresponding to the login account, wherein each group of historical network addresses comprises a login address and a corresponding reporting heartbeat address.

19. The non-transitory computer-readable storage medium according to claim 17, wherein before the determining at least two groups of corresponding network addresses based on the login account, the operations further comprise:
determining whether the lock region configuration is pre-stored locally; and
in response to determining that the lock region configuration is pre-stored locally, performing the determining at least two groups of corresponding network addresses based on the login account; and
in response to determining that the lock region configuration is not pre-stored locally, determining that the client computing device does not belong to the lock region.

20. The non-transitory computer-readable storage medium according to claim 17, wherein before the receiving a login request for logging into a game sent by a client computing device, the operations further comprise:
receiving a request of configuring the lock region sent by a configurator, wherein the request of configuring the lock region carries the lock region configuration and information indicative of a corresponding lock object associated with the game that is restricted from login; and
storing the lock region configuration, the corresponding lock object associated with the game, and a corresponding relationship between them.

* * * * *